(12) United States Patent
Yokoi

(10) Patent No.: US 9,052,508 B2
(45) Date of Patent: Jun. 9, 2015

(54) MICROSCOPE SYSTEM

(71) Applicant: Olympus Corporation, Tokyo (JP)

(72) Inventor: Eiji Yokoi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 247 days.

(21) Appl. No.: 13/744,446

(22) Filed: Jan. 18, 2013

(65) Prior Publication Data
US 2013/0188250 A1    Jul. 25, 2013

(30) Foreign Application Priority Data

Jan. 24, 2012 (JP) ................. 2012-012442

(51) Int. Cl.
G02B 21/06 (2006.01)
G02B 21/08 (2006.01)
G02B 21/16 (2006.01)
G02B 21/36 (2006.01)
G02B 27/58 (2006.01)

(52) U.S. Cl.
CPC .............. *G02B 21/06* (2013.01); *G02B 21/082* (2013.01); *G02B 21/16* (2013.01); *G02B 21/367* (2013.01); *G02B 27/58* (2013.01)

(58) Field of Classification Search
CPC .... G02B 21/082; G02B 21/16; G02B 21/367; G02B 27/58
USPC .................................................. 359/380, 385
See application file for complete search history.

(56) References Cited

U.S. PATENT DOCUMENTS

| 6,525,875 | B1* | 2/2003 | Lauer .................. 359/371 |
| 7,609,391 | B2 | 10/2009 | Betzig |
| 7,894,136 | B2 | 2/2011 | Betzig |
| 7,990,611 | B2 | 8/2011 | Betzig |
| 8,441,709 | B2* | 5/2013 | Matsumoto et al. .......... 359/279 |
| 2002/0060831 | A1* | 5/2002 | Gerchberg .................. 359/237 |
| 2003/0021016 | A1* | 1/2003 | Grier ..................... 359/368 |
| 2003/0030902 | A1* | 2/2003 | Fukushima et al. .......... 359/388 |
| 2009/0046298 | A1 | 2/2009 | Betzig |
| 2009/0073563 | A1 | 3/2009 | Betzig |
| 2009/0135432 | A1 | 5/2009 | Betzig |
| 2010/0224796 | A1* | 9/2010 | Mertz et al. ............... 250/459.1 |
| 2011/0109962 | A1* | 5/2011 | Cui et al. .................. 359/385 |
| 2011/0182529 | A1 | 7/2011 | Kempe et al. |
| 2011/0304723 | A1* | 12/2011 | Betzig .................... 348/79 |

FOREIGN PATENT DOCUMENTS

| EP | 2347294 A1 | 7/2011 |
| JP | 2006-268004 A | 10/2006 |
| JP | 2007-199572 A | 8/2007 |
| WO | WO 2006/058187 A2 | 6/2006 |
| WO | WO 2010/037487 A1 | 4/2010 |

* cited by examiner

*Primary Examiner* — Frank Font
(74) *Attorney, Agent, or Firm* — Holtz, Holtz, Goodman & Chick PC

(57) ABSTRACT

A microscope system that performs structured illumination includes a light source configured to emit illumination light, an objective lens that irradiates a specimen with the illumination light, a phase-modulation spatial light modulator that has a two-dimensional pixel structure, that is arranged at the pupil conjugate position of the objective lens on an illumination light path between the light source and the objective lens, and that is configured to modulate a phase of the illumination light for each pixel so as to form a fringe illumination pattern on the specimen on the basis of an optical parameter of at least one of the light source and the objective lens.

8 Claims, 2 Drawing Sheets

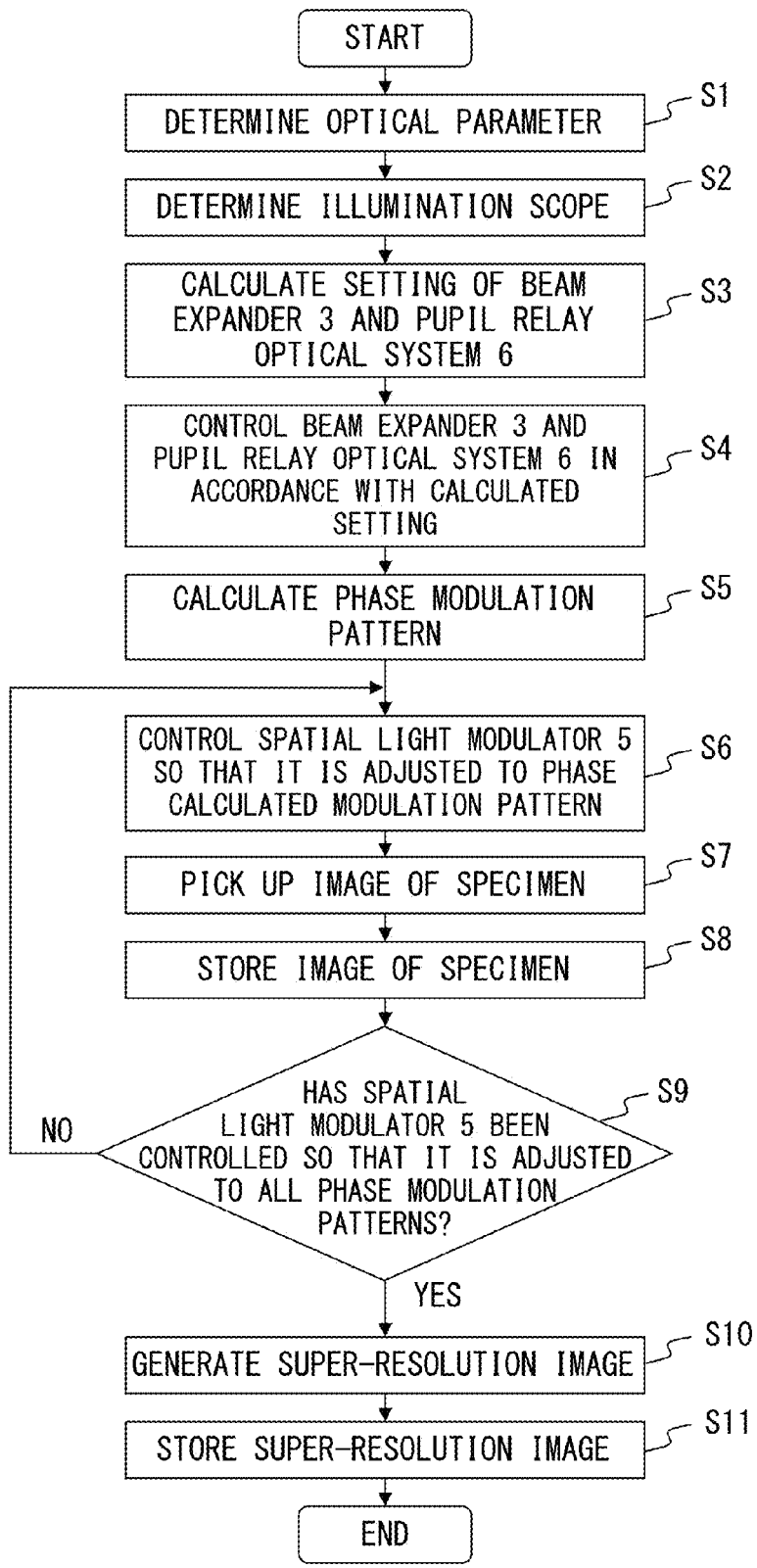
F I G. 2

MICROSCOPE SYSTEM

CROSS REFERENCE TO RELATED APPLICATIONS

This application is based upon and claims the benefit of priority from prior Japanese Patent Application No. 2012-012442, filed Jan. 24, 2012, the entire contents of which are incorporated herein by this reference.

BACKGROUND OF THE INVENTION

1. Field of the Invention

The present invention is related to a microscope system, and particularly to a microscope system that performs structured illumination.

2. Description of the Related Art

In recent years, a technique of obtaining images of a specimen at a resolution exceeding the resolution limit of imaging optical systems including an objective lens (this resolution is referred to as a super-resolution hereinafter) has been developed and put into practical use. As an example of a super-resolution technique, a microscopy referred to as structured illumination microscopy (SIM) is known. According to Kohler illumination, which is a widely accepted illumination method, specimens are illuminated as evenly as possible, whereas structured illumination microscopy illuminates specimens in such a manner that interference with illumination light forms a fringe illumination pattern on the specimens. Thereby, light including specimen information with frequencies higher than those used in other techniques can contribute to image formation so that a specimen image at a resolution exceeding the resolution limit of imaging optical systems (referred to as a super-resolution image, hereinafter) can be generated. Note that according to structured illumination microscopy, the performance based on resolution can be doubled at most under normal circumstances.

A device using structured illumination microscopy as described above is disclosed by, for example, Japanese Laid-open Patent Publication No. 2006-268004. This document discloses a microscope device that forms interference fringes on a specimen by causing interference of positive or negative 1st-order diffracted light from the grating. A microscope device that utilizes 0th-order diffracted light in addition to positive or negative 1st-order diffracted light for causing interference in order to attain sectioning effects is also known.

According to structured illumination microscopy, super-resolution images are generated by performing numerical operations using a plurality of images obtained with different phases of interference fringes that constitute the illumination pattern. This makes it necessary to pick up images of a specimen a plurality of times with different phases of interference fringes. A microscope device disclosed by Japanese Laid-open Patent Publication No. 2006-268004 is capable of picking up images of a specimen with different phases of interference fringes by changing the angle of a steering mirror set close to a pupil conjugate plane of an objective lens.

Also, super-resolution images generated by structured illumination microscopy have super-resolution characteristics only in the directions of interference fringes formed on a specimen. Accordingly, it is usually desirable to pick up images of a specimen a plurality of times with interference fringes in various directions in order to suppress the direction dependency of super-resolution images. Regarding this point, Japanese Laid-open Patent Publication No. 2006-268004 discloses a microscope device that can form interference fringes in three different directions by using a grating having a periodic structure in three directions that are different from each other by sixty degrees.

According to structured illumination microscopy, intervals between interference fringes to be formed on a specimen and movement amounts of interference fringes from one image pick-up operation to another vary depending upon the magnification and the numerical aperture of an objective lens, and upon the wavelength of illumination light. Accordingly, when a different objective lens is used, it is desirable to form on a specimen an illumination pattern appropriate to optical parameters (such as the magnification or numerical aperture) of that objective lens, and when a different light source is used, it is also desirable to form on a specimen an illumination pattern appropriate to optical parameters (such as the wavelength of illumination light) of that light source.

SUMMARY OF THE INVENTION

An aspect of the present invention provides a microscope system that performs structured illumination, including a light source configured to emit illumination light, an objective lens that irradiates a specimen with the illumination light, a phase-modulation spatial light modulator that has a two-dimensional pixel structure, that is arranged at a pupil conjugate position of the objective lens on an illumination light path between the light source and the objective lens, and that is configured to modulate a phase of the illumination light for each pixel so as to form a fringe illumination pattern on the specimen on the basis of an optical parameter of at least one of the light source and the objective lens.

BRIEF DESCRIPTION OF THE DRAWINGS

The present invention will be more apparent from the following detailed description when the accompanying drawings are referenced.

FIG. 2 is a flowchart showing a flow of control of the microscope system exemplified in FIG. 1A.

DESCRIPTION OF THE EMBODIMENTS

Figure 1:
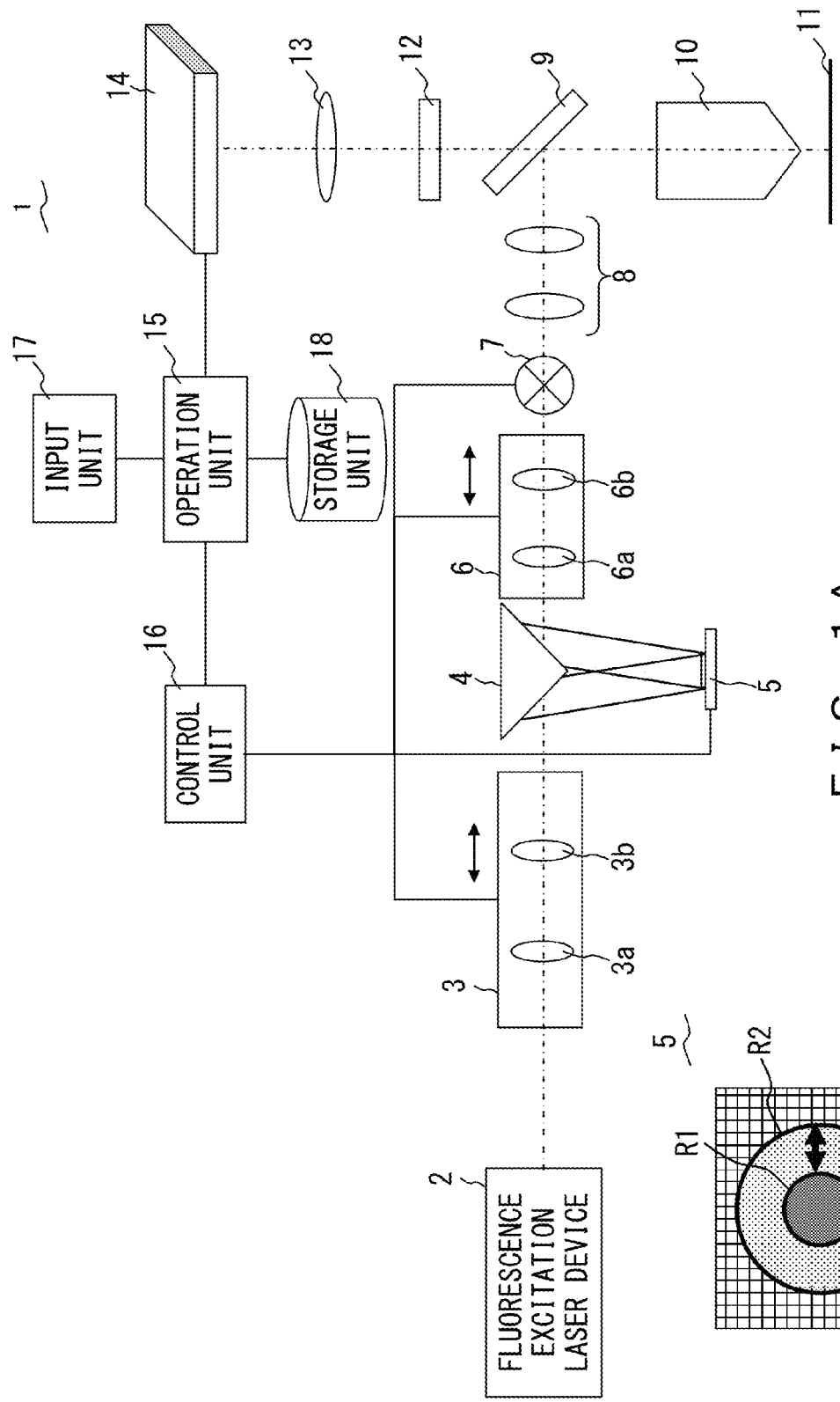
FIG. 1A exemplifies a configuration of a microscope system according to an embodiment of the present invention.
FIG. 1B shows a specific example of functions of a beam expander included in the microscope system exemplified in FIG. 1A.

FIG. 1A and FIG. 1B explain a microscope system according to the present embodiment. FIG. 1A shows a configuration of a microscope system 1 according to the present embodiment. FIG. 1B shows a specific example of functions of a beam expander 3 included in the microscope system 1 exemplified in FIG. 1A. The microscope system 1 is a microscope system that performs structured illumination by making the interference of a laser beam emitted from a fluorescence excitation laser device 2 form interference fringes on a specimen (not shown) set on a specimen plane 11, and is a fluorescence microscope system that uses a two-dimensional imager 14 to detect fluorescence from the specimen that has been excited by the laser beam.

As exemplified in FIG. 1A, the microscope system 1 has, on the illumination light path, the laser device 2 for emitting a laser beam as illumination light, the beam expander 3 for changing the diameter of the laser beam emitted from the laser device 2, a prismatic mirror 4, a phase-modulation spatial light modulator (SLM) 5 for controlling the wave front by modulating the phase of the laser beam, a pupil relay optical system 6, an X-Y scanner 7 for two-dimensionally scanning a specimen on the X-Y plane that is perpendicular to the optical axis of an objective lens 10, a pupil relay optical system 8, a dichroic mirror 9 having a wavelength characteristic that reflects a laser beam emitted from the laser device 2 but transmits fluorescence, and the objective lens 10 that irradiates the specimen on the specimen plane 11 with the laser beam.

As exemplified in FIG. 1A, the microscope system 1 has, on the detection light path, the objective lens 10, the dichroic mirror 9, a barrier filter 12 that blocks a laser beam but transmits fluorescence, a tube lens 13 for collecting fluorescence on the two-dimensional imager 14, and the two-dimensional imager 14 for detecting fluorescence.

Further, the microscope system 1 includes an operation unit 15, a control unit 16, an input unit 17, and a storage unit 18 as exemplified in FIG. 1A.

In the microscope system 1, the phase-modulation spatial light modulator 5 is set at a position that is on the illumination light path between the laser device 2 and the objective lens 10, and that is the pupil conjugated position of the objective lens 10. Also, the X-Y scanner 7 is set at a position that is on the illumination light path between the spatial light modulator 5 and the objective lens 10, and that is the pupil conjugate position of the objective lens 10. That is, the position of the spatial light modulator 5, the position of the X-Y scanner 7, and the pupil position of the objective lens 10 are in a conjugate relationship optically. Thus, the pupil relay optical system 6 projects the image of the spatial light modulator 5 onto the X-Y scanner 7, and the pupil relay optical system 8 projects the image of the X-Y scanner 7 onto the pupil position of the objective lens 10. Also, the two-dimensional imager 14 is set at a position that is optically conjugate with the specimen plane 11.

The laser device 2 is, for example, a titanium-sapphire laser device. A titanium-sapphire laser device is a high-power pulse laser device that causes a non-linear optical phenomenon in a specimen, and emits ultra-short pulse laser beams in the infrared zone. Note that a light source is not limited to a laser device as long as it forms interference fringes on a specimen; however, a laser device is desirable in that the coherency is high.

The beam expander 3 is a beam-diameter varying optical system that varies the luminous flux diameter of the illumination light incident on the spatial light modulator 5, and is set on the illumination light path between the laser device 2 and the spatial light modulator 5. The beam expander 3 includes a plurality of lens groups (lens groups 3a and 3b) as exemplified in FIG. 1A, and is configured to vary the diameter of a laser beam emitted from the laser device 2 by moving at least one of the lens groups in the optical axis direction. By varying the diameter of a laser beam emitted from the laser device 2, the illumination scope (for example, illumination scope R1 or R2) on the spatial light modulator 5 on which a laser beam is projected can be arbitrarily changed.

The prismatic mirror 4 is arranged so that it reflects a laser beam from the beam expander 3 onto the spatial light modulator 5 and reflects a laser beam from the spatial light modulator 5 onto the pupil relay optical system 6.

The spatial light modulator 5 is, as exemplified in FIG. 1B, a phase-modulation spatial light modulator having a two-dimensional pixel structure, and is set at a pupil conjugate position of the objective lens 10. The spatial light modulator 5 is configured to change the phase modulation pattern of the pixel structure in accordance with a control signal from the control unit 16 so as to modulate phases of illumination light for each pixel so that a fringe illumination pattern is formed on a specimen.

As examples of the spatial light modulator 5, a reflective liquid crystal phase modulator, a reflective mirror phase modulator, which drives a mirror so as to cause a difference in light paths, and the like can be used. Also, FIG. 1A exemplifies a case where the spatial light modulator 5 is a reflective device; however, the spatial light modulator 5 is not limited to a reflective device, and may be, for example, a transmissive device such as a transmissive liquid crystal modulator or the like.

The pupil relay optical system 6 is a variable magnification relay optical system, which can vary the magnification for projecting the image of the spatial light modulator 5 onto the pupil plane of the objective lens 10, and is set on the illumination light path between the spatial light modulator 5 and the objective lens 10. The pupil relay optical system 6 includes a plurality of lens groups (lens groups 6a and 6b) as exemplified in FIG. 1A, and is configured to move at least one of the lens groups in the optical axis directions so as to vary the projection magnification.

The X-Y scanner 7 is, for example, a galvanometer Mirror or an Acoustic Optical Deflector (AOD), and functions as an optical deflector unit for changing the position of a fringe illumination pattern formed on a specimen.

The operation unit 15 is configured to generate a super-resolution image by performing numerical operations by using a plurality of images output from the two-dimensional imager 14. A plurality of images used for numerical operations by the operation unit 15 are obtained by picking up images of a specimen a plurality of times under a condition in which interference fringes constituting an illumination pattern are different in phase or in direction.

The operation unit 15 is configured to calculate a phase modulation pattern appropriate to the setting of the microscope. More specifically, the operation unit 15 calculates a phase modulation pattern in a pixel structure for forming an appropriate fringe illumination pattern on a specimen in accordance with optical parameters of at least one of the light source (the laser device 2 in this example) and the objective lens (the objective lens 10 in this example) that are used for the observation. Note that the operation unit 15 calculates a plurality of phase modulation patterns corresponding to a plurality of illumination patterns that have constant intervals between the interference fringes and that are different in phase or direction of the interference fringes.

Intervals of interference fringes that should be formed on a specimen and amounts of movement of interference fringes between image pick-up operations vary depending upon the magnification, the numerical aperture, or the like of the objective lens, and upon the wavelength of the illumination light. Accordingly, optical parameters used for calculating phase modulation patterns desirably include at least one of the wavelength of the illumination light emitted from the light source, the numerical aperture of the objective lens, and the magnification of the objective lens. It is also possible to calculate a phase modulation pattern on the basis of the scope on the specimen plane 11 on which the illumination pattern is formed (referred to as illumination scope hereinafter) in addition to optical parameters.

Further, the operation unit 15 may also be configured to calculate setting of the beam expander 3 and the pupil relay optical system 6 that is appropriate to the setting of the microscope in accordance with optical parameters of the objective lens.

The control unit 16 is configured to control the spatial light modulator 5 so that the spatial light modulator 5 adjusts to the phase modulation pattern calculated by the operation unit 15. As a result of this, the spatial light modulator 5 modulates, in accordance with optical parameters of at least one of the laser device 2 and the objective lens 10, phases of the illumination light for each pixel so that a fringe illumination pattern is formed on a specimen. Also, the control unit 16 may control the beam expander 3 and the pupil relay optical system 6 in accordance with the setting calculated by the operation unit 15. Further, the control unit 16 may control the X-Y scanner 7.

The input unit 17 is configured to receive instructions from users. Users can use the input unit 17 so as to specify optical parameters (such as, for example, the magnification, the numerical aperture, the pupil diameter, or the like) of the objective lens 10, optical parameters of the laser device 2 (such as, for example, the wavelength of the laser beam, or the like), and the illumination scope.

The storage unit 18 is configured to store images output from the two-dimensional imager 14, and super-resolution images generated by the operation unit 15. The storage unit 18 may beforehand store information related to a setting of the microscope such as optical parameters of the objective lens 10 and the laser device 2. In such a case, operations of inputting optical parameters of the objective lens 10 and the laser device 2 by users by using the input unit 17 may be omitted. Also, when the microscope system 1 is configured to switch various different light sources and objective lenses so as to use them, the storage unit 18 may beforehand store optical parameters of a plurality of light sources and objective lenses that can be used. In such a case, users can select, through the input unit 17, a light source and an objective lens to be used so as to omit operations of direct input of optical parameters of the light source and the objective lens to be used.

FIG. 2 is a flowchart showing the flow of the control performed by the microscope system exemplified in FIG. 1A. Hereinafter, detailed explanations based on FIG. 2 will be given for the flow of the control of the microscope system 1 exemplified in FIG. 1A.

First, in step S1, optical parameters of at least one of the objective lens 10 and the laser device 2 that are to be used are determined as values to be used for a numerical operation. Optical parameters are determined, for example, by direct input by a user using the input unit 17. Optical parameters of the objective lens 10 and the laser device 2 may also be determined by reading optical parameters necessary to calculations of phase modulation patterns from the storage unit 18 that has beforehand stored optical parameters of the objective lens 10 or the laser device 2. Phase modulation patterns will be explained in detail later. When switching is performed between objective lenses or light sources, optical parameters may be determined by a user's selecting of the objective lens and the light source to be used through the input unit 17 and reading of necessary optical parameters among optical parameters corresponding to the selected objective lens and the light source from the storage unit 18.

In step S2, the illumination scope, in which the illumination pattern is formed on the specimen plane 11, is determined. An illumination scope is determined when, for example, the user directly inputs the scope through the input unit 17. The entire field of view may also be determined as an illumination scope when there are no inputs from users.

In step S3, the operation unit 15 calculates the setting of the beam expander 3 and the pupil relay optical system 6. A laser beam incident on an objective lens having a beam diameter greater than the pupil diameter leads to losses of the amount of light, whereas a smaller beam diameter degrades the resolution. Thus, the operation unit 15 calculates the setting of the beam expander 3 and the pupil relay optical system 6 (i.e., the diameter of the beam emitted from the beam expander 3 and the projection magnification of the pupil relay optical system 6) in accordance with the pupil diameter of the objective lens 10 among the optical parameters determined in step S1 so that the laser beam incident on the objective lens has a beam diameter substantially the same as the pupil diameter. When an objective lens to be used has a small pupil diameter, the number of pixels of the spatial light modulator 5 projected onto the inside of the pupil decreases. Accordingly, it is desirable that a projection magnification be calculated for the pupil relay optical system 6 so that the image of the spatial light modulator 5 projected onto the pupil plane of the objective lens includes at least a prescribed number of pixels in the pupil, and that a diameter of a beam emitted from the beam expander 3 be calculated so that the beam diameter of a laser beam incident on the pupil of the objective lens 10 is substantially the same as the pupil diameter in a state in which the calculated projection magnification is set in the pupil relay optical system 6.

In step S4, the control unit 16 controls the beam expander 3 and the pupil relay optical system 6 in accordance with the setting calculated in step S3, and thereby changes the diameter of a beam emitted from the beam expander 3 and the projection magnification of the pupil relay optical system 6.

In step S5, the operation unit 15 calculates a phase modulation pattern appropriate to the setting of the microscope. In structured illumination, intervals between interference fringes to be formed on a specimen and movement amounts of interference fringes from one image pick-up operation to another vary depending upon magnification and the numerical aperture of objective lenses, and upon the wavelengths of illumination light. Accordingly, a phase modulation pattern for forming an illumination pattern having desired interference fringes is calculated on the basis of at least one of the wavelength of the laser beam emitted from the laser device 2, the numerical aperture of the objective lens 10, and the magnification of the objective lens 10 among optical parameters determined in step S1. Also, when an illumination scope on a specimen is smaller than the entire field of view, the illumination amount per unit area increases, which results in brighter images. Thus, it is desirable to calculate a phase modulation pattern for forming an illumination pattern having desired interference fringes on the basis of the illumination scope determined in step S2 in addition to the above described optical parameters.

In step S5, a plurality of phase modulation patterns corresponding to a plurality of illumination patterns having constant interference fringe intervals and different phases or directions of the interference fringes are calculated. For example, nine phase modulation patterns that correspond to nine illumination patterns having interference fringes 60 degree different from each other in direction and interference fringes ⅓ different from each other in phase are calculated.

In step S6, the control unit 16 controls the spatial light modulator 5 so that the spatial light modulator 5 is adjusted to the phase modulation pattern calculated in step S5, and thereby an illumination pattern appropriate to the setting of the microscope is formed on the specimen plane 11.

In step S7, an image of the specimen is picked up by the two-dimensional imager 14 so as to generate the specimen image, and the generated image is stored in the storage unit 18 in step S8.

In step S9, it is confirmed whether or not the spatial light modulator 5 has been controlled so that it is adjusted to all phase modulation patterns calculated in step S5. This process is repeated from step S6 through step S8 for all phase modulation patterns calculated in step S5.

Thereafter, the operation unit 15 generates, in step S10, a super-resolution image based on a numerical operation using a plurality of images stored in the storage unit 18, and the storage unit 18 stores the generated super-resolution images in step S11.

The microscope system 1 according to the present embodiment can form on a specimen illumination patterns having interference fringes different in interval, phase, or direction by changing phase modulation patterns of the spatial light modulator 5. Accordingly, arbitrary illumination patterns can be formed on a specimen. Also, in the microscope system 1, the operation unit 15 calculates phase modulation patterns in accordance with optical parameters of at least one of the light source and the objective lens, and the control unit 16 controls the spatial light modulator 5 so that it is adjusted to calculated phase modulation patterns. Thereby, it is possible to respond to a case where objective lenses and light sources are switched. Therefore, according to the microscope system 1, regardless of the setting of the microscope, structured illumination can be performed using appropriate illumination patterns.

Also, in the microscope system 1, the operation unit 15 calculates setting of the beam expander 3 and the pupil relay optical system 6 on the basis of optical parameters of objective lenses, and the control unit 16 controls the beam expander 3 and the pupil relay optical system 6 in accordance with the calculated setting. Thereby, the diameter of a beam incident on the pupil of an objective lens can be substantially the same as the diameter of the pupil. Accordingly, the microscope system 1 can also suppresses the degradation of resolution while suppressing losses in the amount of light even when objective lenses having different pupil diameters are used.

Also, in the microscope system 1, the operation unit 15 takes into consideration the illumination scope in addition to optical parameters for calculating phase modulation patterns, thereby making it possible to cast illumination light only to a necessary scope. Therefore, according to the microscope system 1, it is possible to limit the illumination scope on a specimen so as to obtain brighter images.

Also, the microscope system 1 only has to change the phase modulation patterns of the spatial light modulator 5 arranged at a pupil conjugate position of the objective lens 10 in order to form arbitrary illumination patterns on a specimen. Therefore, according to the microscope system 1, it is possible to perform structured illumination without employing an excessively complicated configuration.

Also, the microscope system 1 can use a reflective liquid crystal phase modulator or a transmissive liquid crystal phase modulator as the spatial light modulator 5 so that it can change illumination patterns without causing mechanical driving. This results in the absence of illumination pattern deterioration due to vibrations caused by mechanical driving, thereby an illumination pattern appropriate to the setting of the microscope can be strictly formed on the specimen. Therefore, according to the microscope system 1, it is possible to generate super-resolution images having super-resolution characteristics as aimed at in the setting. Also, rapid switching of illumination patterns does not cause vibrations, making it possible to switch illumination patterns rapidly. This makes it possible to generate super-resolution images at a high speed.

Also, the microscope system 1 employs the spatial light modulator 5 of a phase modulation type, and accordingly is able to project, onto a specimen plane, light incident on the spatial light modulator without losing the light, making it possible to reduce losses in the amount of light in comparison with a case of employing a spatial light modulator of an intensity modulation type.

An example has been given where illumination patterns having interference fringes different from each other in phase are formed by changing phase modulation patterns of the spatial light modulator 5. However, illumination patterns having interference fringes different from each other in phase may also be formed by deflecting a laser beam by using the X-Y scanner 7. That is, the X-Y scanner 7 may also be used instead of the spatial light modulator 5 as a device for changing phases of interference fringes.

Also, while a configuration of a two-photon excitation fluorescence microscope system is exemplified in FIG. 1A, the microscope system according to the present invention is not limited to a two-photon excitation fluorescence microscope system. A microscope system according to the present invention may also be configured as, for example, a one-photon excitation fluorescence microscope system.

What is claimed is:

1. A microscope system that performs structured illumination, comprising:
    a light source configured to emit illumination light;
    an objective lens that irradiates a specimen with the illumination light;
    a phase-modulation spatial light modulator that has a two-dimensional pixel structure, that is arranged at a pupil conjugate position of the objective lens on an illumination light path between the light source and the objective lens, and that is configured to modulate a phase of the illumination light for each pixel so as to form a fringe illumination pattern on the specimen based on an optical parameter of at least one of the light source and the objective lens; and
    an optical deflector unit that is arranged on an illumination light path between the spatial light modulator and the objective lens, and that is configured to move a position on the specimen at which the fringe illumination pattern is formed;
    wherein the optical parameter includes at least one of a wavelength of the illumination light emitted from the light source, a numerical aperture of the objective lens, and a magnification of the objective lens.

2. The microscope system according to claim 1, further comprising:
    an operation unit configured to calculate a phase modulation pattern having the pixel structure for forming the fringe illumination pattern on the specimen based on the optical parameter of the at least one of the light source and the objective lens.

3. The microscope system according to claim 2, wherein:
    the operation unit is configured to calculate the phase modulation pattern based on the optical parameter and a parameter related to an illumination scope on the specimen in which the illumination pattern is formed.

4. The microscope system according to claim 1, further comprising:
    a beam-diameter varying optical system that is arranged on an illumination light path between the spatial light modulator and the light source, and that is configured to vary a luminous flux diameter of the illumination light incident on the spatial light modulator.

5. The microscope system according to claim 1, further comprising:
    a variable magnification relay optical system that is arranged on the illumination light path between the spatial light modulator and the objective lens, and that is configured to vary a magnification at which an image of the spatial light modulator is projected onto a pupil plane of the objective lens.

6. The microscope system according to claim 1, wherein the light source comprises a laser device that emits a laser beam.

7. The microscope system according to claim 6, wherein the laser device comprises a high-power pulse laser device that causes a non-linear optical phenomenon in the specimen.

8. A microscope system that performs structured illumination, comprising:
- a light source configured to emit illumination light;
- an objective lens that irradiates a specimen with the illumination light;
- a phase-modulation spatial light modulator that has a two-dimensional pixel structure, that is arranged at a pupil conjugate position of the objective lens on an illumination light path between the light source and the objective lens, and that is configured to modulate a phase of the illumination light for each pixel so as to form a fringe illumination pattern on the specimen on the basis of an optical parameter of at least one of the light source and the objective lens; and
- a variable magnification relay optical system that is arranged on an illumination light path between the spatial light modulator and the objective lens, and that is configured to vary a magnification at which an image of the spatial light modulator is projected onto a pupil plane of the objective lens;

wherein the optical parameter includes at least one of a wavelength of the illumination light emitted from the light source, a numerical aperture of the objective lens, and a magnification of the objective lens.

* * * * *